United States Patent
Yamasaki

(10) Patent No.: US 8,877,386 B2
(45) Date of Patent: Nov. 4, 2014

(54) BATTERY ELECTRODE PRODUCTION METHOD

(75) Inventor: Nobuyuki Yamasaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 84 days.

(21) Appl. No.: 13/513,865

(22) PCT Filed: Dec. 10, 2009

(86) PCT No.: PCT/JP2009/070649
§ 371 (c)(1),
(2), (4) Date: Jun. 5, 2012

(87) PCT Pub. No.: WO2011/070661
PCT Pub. Date: Jun. 16, 2011

(65) Prior Publication Data
US 2012/0244433 A1    Sep. 27, 2012

(51) Int. Cl.
*H01M 4/62* (2006.01)
*H01M 4/13* (2010.01)
*H01M 4/04* (2006.01)
*H01M 4/64* (2006.01)
*H01M 4/139* (2010.01)

(52) U.S. Cl.
CPC .............. *H01M 4/139* (2013.01); *Y02E 60/122* (2013.01); *H01M 4/0404* (2013.01)
USPC .............. 429/232; 429/217; 429/211; 427/58

(58) Field of Classification Search
USPC .............................. 429/232, 217, 211; 427/58
See application file for complete search history.

(56) References Cited

U.S. PATENT DOCUMENTS

| 4,963,161 A | 10/1990 | Chi et al. |
| 6,432,585 B1* | 8/2002 | Kawakami et al. ........... 429/233 |
| 2004/0234850 A1 | 11/2004 | Watarai et al. |
| 2005/0064096 A1* | 3/2005 | Kurihara et al. .............. 427/215 |
| 2010/0112447 A1* | 5/2010 | Yamamoto et al. ........... 429/223 |

FOREIGN PATENT DOCUMENTS

| JP | 1-241766 | 9/1989 |
| JP | 3-46772 | 2/1991 |
| JP | 11-73947 | 3/1999 |
| JP | 11-176423 | 7/1999 |

(Continued)

OTHER PUBLICATIONS

International Search Report in International Application No. PCT/JP2009/070649; Mailing Date: Feb. 9, 2010.

*Primary Examiner* — Zachary Best
*Assistant Examiner* — Angela Martin
(74) *Attorney, Agent, or Firm* — Finnegan, Henderson, Farabow, Garrett & Dunner, LLP

(57) ABSTRACT

The electrode production method provided by the present invention includes a step of mixing microbubbles 52 into a binder solution 50 containing a binder, a step of forming a binder solution layer 56 by imparting the bubble-containing binder solution 50 to a current collector 10, a step of depositing the binder solution layer 56 and a paste layer 36 on the current collector 10 by imparting an active material layer-forming paste containing an active material 32 over the binder solution layer 56, and a step of obtaining an electrode in which a binder layer and an active material layer are formed on the current collector 10 by drying both the deposited binder solution layer 56 and the paste layer 36.

6 Claims, 4 Drawing Sheets

(56) References Cited

FOREIGN PATENT DOCUMENTS

| JP | 2003-173781 | 6/2003 |
| JP | 2003-208918 | 7/2003 |
| JP | 2004-288520 | 10/2004 |
| JP | 2007-191358 | 8/2007 |
| JP | 2008-123791 | 5/2008 |

\* cited by examiner

BATTERY ELECTRODE PRODUCTION METHOD

CROSS-REFERENCE TO RELATED APPLICATIONS

This application is a national phase application of International Application No. PCT/JP2009/070649, filed Dec. 10, 2009, the content of which is incorporated herein by reference.

TECHNICAL FIELD

The present invention relates to a method of producing a battery electrode, and more particularly to a production method of a battery electrode having a configuration in which an electrode mixture layer containing an electrode active material is retained in a current collector.

BACKGROUND ART

Lithium ion batteries, nickel hydrogen batteries and other secondary batteries have become increasingly important in recent years as vehicle-mounted power supplies or as power supplies of personal computers and portable devices. In particular, lithium secondary batteries, which are lightweight and allow the obtaining of high energy density, are expected to be preferably used as vehicle-mounted high-output power supplies. In a typical configuration of this type of secondary battery, an electrode is provided having a configuration in which a material capable of reversibly storing and releasing lithium ions (electrode active material) is retained in an electrically conductive member (electrode current collector). For example, a typical example of an electrode active material used in a positive electrode (positive electrode active material) is an oxide containing lithium and one type or two or more types of transition metal elements as constituent metal elements thereof. In addition, a typical example of a current collector used in a positive electrode (positive electrode current collector) is a sheet-like or foil-like member consisting mainly of aluminum or an aluminum alloy.

An example of a typical method of retaining a positive electrode active material in a positive electrode current collector in the production of a positive electrode having such a configuration consists of coating a paste-like or slurry-like active material layer-forming material, in which a powder of a positive electrode active material and a binder are dispersed in a suitable medium (to be referred to as an active material layer-forming paste), onto a positive electrode current collector, and drying this by passing through a hot air dryer and the like to form a layer containing the positive electrode active material (positive electrode active material layer). The binder contained in the positive electrode active material layer is composed of, for example, a polymer material, and fulfills the role of binding positive electrode active materials contained in the positive electrode active material layer or binding the positive electrode active material layer and the positive electrode current collector. Patent Document 1 is an example of the prior art relating to this type of electrode production.

Patent Document 1: Japanese Patent Application Laid-open No. H11-176423

However, in the production of an electrode as described above, when a mixture layer-forming paste containing an active material and a binder is coated onto a current collector and dried by applying hot air, convection occurs during drying, and since binder in the vicinity of the current collector rises to the surface layer of the paste coating (opposite side of the current collector), the amount of binder in the vicinity of the current collector decreases, thereby resulting in the problem of a decrease in adhesion (adhesive strength) between the current collector and the mixture layer.

In Patent Document 1, a technology is described for enhancing adhesion between a current collector and a mixture layer by providing a binder layer containing a binder between a current collector and an active material layer. In Patent Document 1, the active material layer is layered over this binder layer. The use of this method enhances adhesion between the binder layer and the active material layer, thereby making it possible to prevent interlayer separation.

However, when a binder layer containing a binder (polymer material) is provided between a current collector and an active material layer in the manner of Patent Document 1, since the electrical conductivity of the binder layer is low, there is the possibility of an increase in electrical resistance between the current collector and the active material layer. Since an increase in electrical resistance between the current collector and the active material layer results in an increase in internal resistance of the battery, battery performance of a battery constructed using an electrode having this binder layer can decrease considerably in comparison with batteries in which this binder layer is not formed.

DISCLOSURE OF THE INVENTION

With the foregoing in view, a primary object of the present invention is to provide a battery electrode production method that makes it possible to lower interfacial resistance between a current collector and an active material layer in a battery electrode of a configuration in which a binder layer and an active material layer are sequentially laminated onto a current collector.

According to the present invention, a method is provided for producing a battery electrode having a configuration in which a binder layer containing a binder and an active material layer containing an active material are sequentially laminated onto a current collector. This method includes a step of mixing microbubbles into a binder solution containing a binder, a step of forming a binder solution layer by imparting the bubble-containing binder solution to a current collector, a step of depositing the binder solution layer and a paste layer onto the current collector by imparting an active material layer-forming paste containing an active material onto the binder solution layer, and a step of obtaining an electrode in which a binder layer and an active material layer are formed on the current collector by drying both the deposited binder solution layer and paste layer.

Here, microbubbles as referred to in the present invention refer to fine air bubbles having a diameter on the micrometer order or a smaller size (namely, a diameter on the nanometer order of not more than 1 μm), which have a bubble diameter of, for example, 50 μm or less (and particularly preferably 10 μm or less). Since microbubbles are extremely fine air bubbles and they typically have charging action (typically the surfaces of microbubbles are negatively charged), the joining and growth of bubbles are inhibited and their floating rate slows, thereby enabling them to remain in a liquid for a long period of time.

According to the method of the present invention, since a binder solution is imparted to a current collector after having mixed the above-mentioned microbubbles therein, during the period until the subsequent drying, the microbubbles continue to remain in the binder solution layer (namely, the wet binder layer). When the binder solution layer is dried while in this state, since the microbubbles escape to the outside while maintaining their internal space, a large number of remnants of the escaped microbubbles (pores) are formed in the binder layer obtained after drying. An electrically conductive path is secured between the current collector and the active material layer through these remnants of the escaped microbubbles (pores) (and typically, via the active material and electrically conductive material that have filled the pores), thereby making it possible to lower the interfacial resistance between the current collector and the active material layer. Namely, according to the method of the present invention, adhesion (adhesive strength) between the current collector and the active material layer can be enhanced by the binder layer while inhibiting increases in interfacial resistance between the current collector and the active material layer due to the remnants of the escaped microbubbles (pores), thereby enabling the production of a high-performance battery electrode that realizes both current collection performance and adhesion.

In a preferable aspect of the production method disclosed herein, bubbles that are mixed in as microbubbles are smaller than the thickness of the binder solution layer. In a preferable technology disclosed herein, the binder solution layer is formed to a thickness of 5 μm to 100 μm. For example, in the case the binder solution layer is formed to a thickness of about 10 μm, bubbles are preferably mixed in that have a diameter of less than 10 μm (typically, 1 μm to 10 μm, and particularly preferably 2 μm to 10 μm). If microbubbles are used having a diameter that exceeds the thickness of the binder solution layer to be formed, the bubbles easily escape from the binder solution layer, which may prevent the formation of remnants of escaped microbubbles (pores of a preferable size for securing an electrically conductive path between the current collector and the active material layer) in the binder layer.

Although there are no particular limitations on the lower limit of bubble diameter, the lower limit is, for example, about 1 μm. If bubble diameter is smaller than this diameter, the microbubbles gradually reduce in size in the binder solution layer and eventually dissolve (prior to drying of the binder solution layer), which may prevent the formation of remnants of escaped microbubbles (pores) of a suitable size in the binder layer. Thus, the bubble diameter of the microbubbles is generally 1 μm or more (preferably, 5 μm or more), and is preferably less than the thickness of the binder solution layer to be formed (for example, less than 10 μm). For example, since bubbles having a diameter of 1 μm to 20 μm, and particularly 2 μm to 10 μm, have a slow floating rate in the binder solution and are present therein for a long period of time, such bubbles are preferable in terms of enabling the stable formation of desired remnants of escaped microbubbles (pores) in the binder layer.

In a preferable aspect disclosed herein, bubbles composed of a gas having a lower specific heat than the solvent of the binder solution are mixed in as the above-mentioned microbubbles. For example, in the case of using water (specific heat: 4.271 J/g·K) for the solvent of the binder solution, bubbles are mixed in that are composed of a gas having a specific heat lower than that of water. In a preferable technology disclosed herein, bubbles composed of an Ar gas (specific heat: 0.523 J/g·K) are mixed in. As a result of containing a gas having a lower specific heat than that of the solvent of the binder solution in this manner, the binder solution layer becomes easier to dry, thereby making it possible to enhance drying efficiency (and in turn, electrode productivity).

Furthermore, the above-mentioned binder solution can also contain other binder layer-forming components as necessary in addition to the binder and microbubbles. An example of such a material is an electrically conductive material. Carbon-based materials such carbon black represented by acetylene black (AB) or carbon fibers, for example, are preferably used as electrically conductive materials. Alternatively, an electrically conductive metal power such as nickel powder may also be used. The use of a binder solution containing an electrically conductive material makes it possible to impart electrical conductivity to an insulating binder layer, thereby further reducing the interfacial resistance between the current collector and the active material layer.

In a preferable aspect disclosed herein, the microbubbles are charged to a prescribed polarity, and the binder solution contains an electrically conductive material that can be charged to a polarity opposite that of the polarity of the microbubbles. For example, in the case the microbubbles are negatively charged, the electrically conductive material is preferably positively charged. When the electrically conductive material is positively charged (charged to a polarity opposite that of the polarity of the microbubbles) in this manner, the electrically conductive material gathers around the microbubbles due to electrical attraction (electrostatic attraction). Consequently, the electrically conductive material is selectively arranged in the remnants of escaped microbubbles (pores) formed as a result of drying. As a result, interfacial resistance between the current collector and the active material layer can be effectively reduced.

According to the present invention, a battery (such as a lithium secondary battery) is provided that is constructed using an electrode obtained according to any of the methods disclosed herein. Since this battery is constructed using the above-mentioned electrode for at least one of the electrodes, it demonstrates superior battery performance. For example, a battery can be provided that satisfies at least one of superior output characteristics, high cycle durability and favorable productivity by constructing the battery using the above-mentioned electrode.

This battery is preferable for use as a battery equipped in a vehicle such as an automobile. Thus, according to the present invention, a vehicle is provided that is equipped with any of the batteries disclosed herein (and can be in the form of an assembled battery in which a plurality of batteries are mutually connected). In particular, since a high output is able to be obtained, the vehicle is preferably a vehicle (such as an automobile) in which the above-mentioned battery is a lithium secondary battery (and typically, a lithium ion battery), and the lithium secondary battery is provided as a motive power supply (and typically, a motive power supply of a hybrid vehicle or electric vehicle).

DESCRIPTION OF EMBODIMENTS

Figure 1:
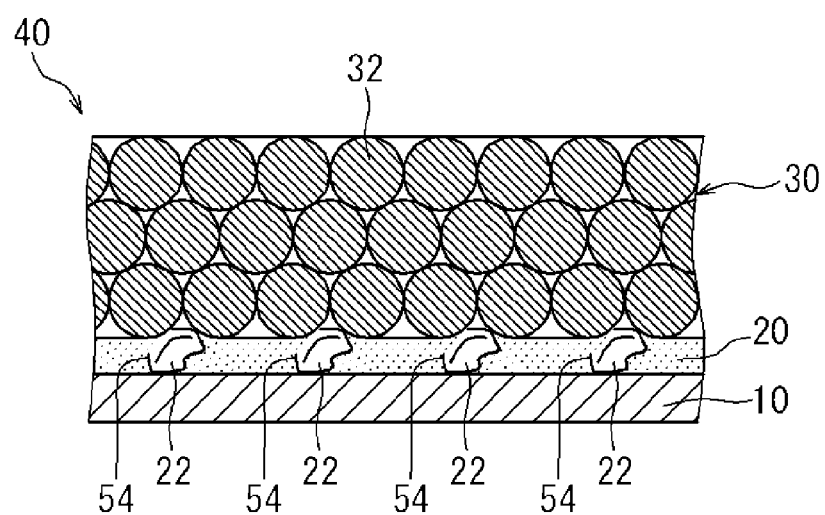
FIG. 1 is a cross-sectional view schematically showing a positive electrode according to an embodiment of the present invention.

The following provides an explanation of embodiments according to the present invention while referring to the drawings. In the drawings described to follow, those members or sites that demonstrate the same actions are explained by indicating with the same reference symbols. Furthermore, the dimensional relationships (such as length, width and thickness) in each of the drawings are not intended to reflect actual dimensional relationships. In addition, those matters required for carrying out the present invention other than those matters specifically mentioned in the present description (such as the configuration and production method of an electrode body provided with a positive electrode and negative electrode, the configuration and production method of a separator and electrolyte, or general technical matters relating to construction of the battery and other batteries) can be understood to be design matters for a person with ordinary skill in the art based on the prior art in the relevant field.

Although not intended as being limiting, the following provides an explanation of the battery electrode production method according to the present embodiment by mainly using the example of a positive electrode (positive electrode sheet) for a lithium secondary battery (and typically, a lithium ion battery).

As shown in FIG. 1, the electrode production method disclosed herein is a method of producing a battery positive electrode 40 having a configuration in which a binder layer 20 containing a binder, and a positive electrode active material layer 30 containing a positive electrode active material 32 are sequentially laminated on a positive electrode current collector 10.

Figure 2:
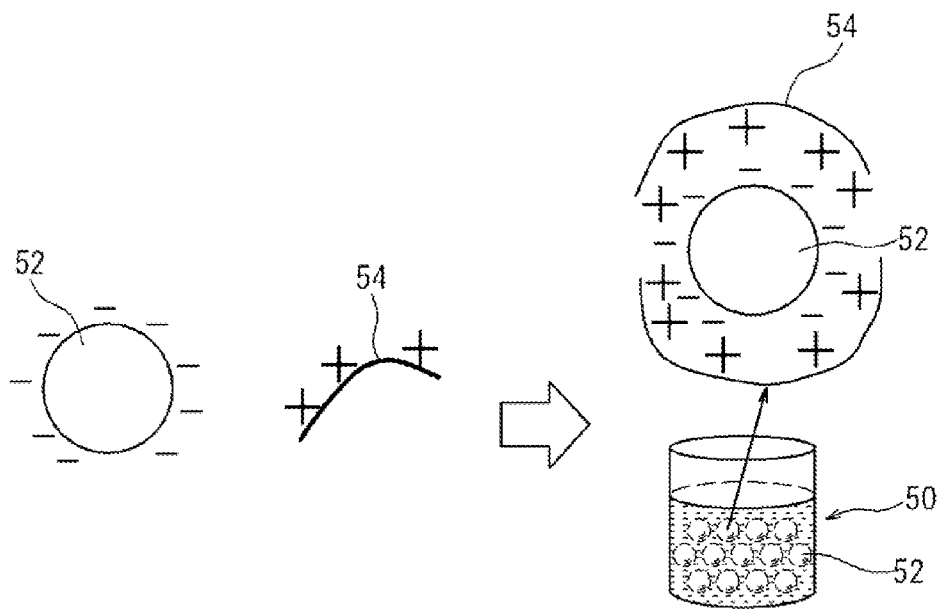
FIG. 2 is a drawing schematically showing a binder solution according to an embodiment of the present invention.
Figure 3:
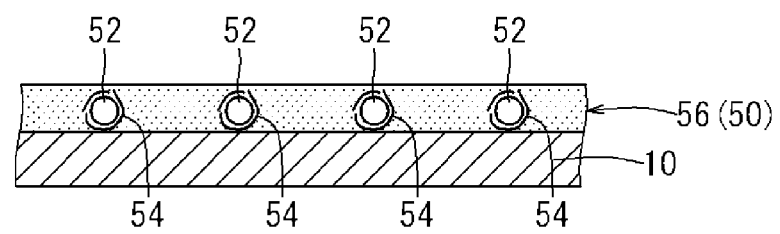
FIG. 3 is a cross-sectional view schematically showing a production process of a positive electrode according to an embodiment of the present invention.

In this electrode production method, as shown in FIG. 2, a binder solution 50 is first prepared in which a binder (not shown) is dispersed in a prescribed solvent (such as water), followed by mixing microbubbles 52 into the binder solution. Next, as shown in FIG. 3, the microbubble 52-containing binder solution 50 is imparted to the current collector 10 to form a binder solution layer (namely, a wet binder layer) 56. Next, as shown in FIG. 4, an active material layer-forming paste containing the positive electrode active material 32 is imparted onto the binder solution layer 56 to deposit the binder solution layer 56 and a paste layer (namely, wet active material layer) 36 on the positive electrode current collector 10, and as shown in FIG. 5, the deposited binder solution layer 56 and the paste layer 36 are both dried to obtain a positive electrode 40 in which the binder layer 20 and the positive electrode active material layer 30 are formed on the positive electrode current collector 10.

Here, the microbubbles 52 refer to fine bubbles of a size having a diameter on the micrometer order or smaller (namely, a diameter on the nanometer order of not more than 1 μm) having a bubble diameter of, for example, 50 μm or less (and particularly preferably 10 μm or less). Since the microbubbles 52 are extremely fine bubbles and typically have a charging action (typically, the surface of the microbubbles 52 is negatively charged as shown in FIG. 2), joining and growth of the bubbles is inhibited, their floating rate is slow, and as a result thereof, they remain in liquid for a long period of time.

Figure 4:
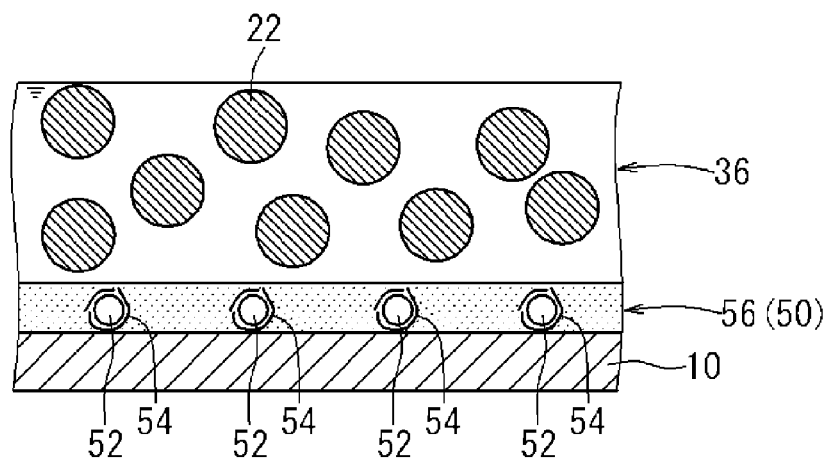
FIG. 4 is a cross-sectional view schematically showing a production process of a positive electrode according to an embodiment of the present invention.
Figure 5:
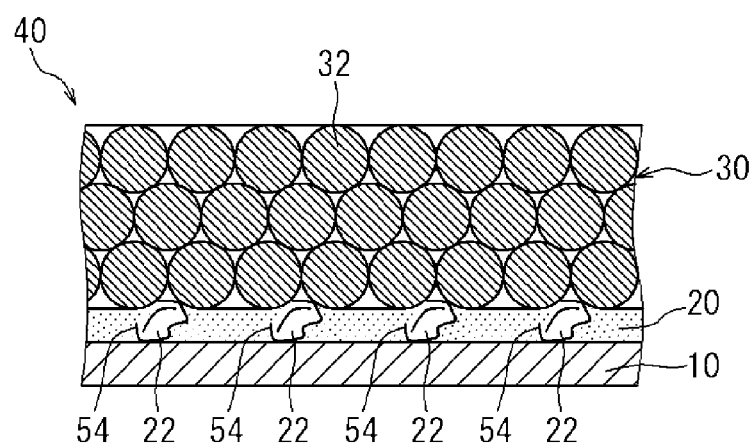
FIG. 5 is a cross-sectional view schematically showing a production process of a positive electrode according to an embodiment of the present invention.

According to the method of the present embodiment, as shown in FIGS. 3 and 4, since the microbubbles 52 are imparted to the current collector 10 after having mixing into the binder solution 50, during the subsequent period until drying, the microbubbles 52 continue to remain in the binder solution layer 56. When the binder solution layer 56 is dried while in this state, since the microbubbles 52 escape to the outside while maintaining their internal space, as shown in FIG. 5, a large number of remnants of the escaped microbubbles (pores) 22 are formed in the binder layer 20 obtained after drying. An electrically conductive path is secured between the current collector 10 and the active material layer 30 through these remnants of escaped microbubbles (pores) 22 (and typically, via an active material or subsequently described electrically conductive material 54 filled into the pores 22), thereby making it possible to lower interfacial resistance between the current collector 10 and the active material layer 30. Namely, according to the method of the present embodiment, increases in interfacial resistance between the current collector 10 and the active material layer 30 can be inhibited by the remnants of microbubbles (pores) 22 while adhesion (bonding strength) between the current collector 10 and the active material layer 30 is enhanced by the binder layer 20, thereby making it possible to produce a high-performance battery electrode 40 that realizes both current collection performance and adhesion.

The following provides a more detailed explanation of the present embodiment. In the production method of the present embodiment, the binder solution 50 containing a binder is first produced as shown in FIG. 2, after which the microbubbles 52 are mixed into the binder solution 50.

An aqueous solvent is preferably used for the solvent of the binder solution from various viewpoints, such as reducing the environmental impact, reducing material costs, simplifying equipment, reducing waste and improving handling ease. Water or a mixed solvent composed mainly of water is preferably used for the aqueous solvent. One type or two or more types of organic solvents able to uniformly mix with water (such as lower alcohols or lower ketones) can be suitably selected and used as solvent components other than water that compose the mixed solvent. For example, an aqueous solvent is used preferably in which 80% by weight or more (more preferably 90% by weight or more, and even more preferably 95% by weight or more) of the aqueous solvent is water. A particularly preferable example is an aqueous solvent substantially composed of water. Alternatively, the solvent is not limited to an aqueous solvent, but rather may also be a non-aqueous solvent. An example of a non-aqueous solvent that can be used is N-methylpyrrolidone (NMP).

There are no particular limitations on the gas that composes the microbubbles provided it is able to stably remain in the solvent of the binder solution. Examples of gases that can be used include argon (Ar) gas, carbon dioxide ($CO_2$) gas, nitrogen ($N_2$) gas and air. A particularly preferable example of a gas is Ar gas. These constituent gases may each be used alone or two or more types may be used in combination.

In a preferable aspect disclosed herein, bubbles composed of a gas having specific heat lower than the solvent of the binder solution are mixed as the above-mentioned microbubbles. For example, in the case of using water (specific heat: 4.271 J/g·K) for the solvent of the binder solution, bubbles are mixed in that are composed of a gas having specific heat lower than that of water. In a preferable technology disclosed herein, bubbles are mixed in that are composed of Ar gas (specific heat: 0.523 J/g·K). As a result of containing a gas having lower specific heat than the solvent of the binder solution in this manner, the binder solution layer 56 becomes easier to dry, thereby making it possible to enhance drying efficiency (and in turn, electrode productivity).

Although there are no particular limitations on the bubble diameter of the microbubbles, bubbles are preferably mixed in that are smaller than the thickness of the binder solution layer 56. For example, in the case of forming the binder solution layer to a thickness of about 10 μm, bubbles are preferably mixed in that have a diameter of less than 10 μm (and typically, 1 μm to 10 μm, and in a particularly preferable aspect, 2 μm to 10 μm). If microbubbles are used having a diameter that exceeds the thickness of the binder solution layer 56 to be formed, the bubbles easily escape from the binder solution layer 56, and it may not be possible to form suitable remnants of escaped microbubbles (pores of a preferable size for securing an electrically conductive path between the current collector and the active material layer) 22 in the binder layer 20.

Although there are no particular limitations on the lower limit of bubble diameter, it is, for example, about 1 μm. If bubble diameter is smaller than this diameter, the microbubbles gradually reduce in size in the binder solution layer and eventually dissolve (prior to drying of the binder solution layer), which may prevent the formation of remnants of escaped microbubbles (pores) 22 of a suitable size in the binder layer 20. Thus, the bubble diameter of the microbubbles is generally 1 μm or more (preferably, 5 μm or more), and is preferably less than the thickness of the binder solution layer to be formed (for example, 10 μm or less). For example, since bubbles having a diameter of 1 μm to 20 and particularly 2 μm to 10 μm, have a slow floating rate in liquid and are present therein for a long period of time, such bubbles are preferable in terms of enabling the stable formation of desired remnants of escaped microbubbles (pores) in the binder layer.

Although there are no particular limitations thereon, the total volume of bubbles contained per 1 cm$^3$ of the binder solution in which the microbubbles have been mixed is about 0.1 cm$^3$ to 0.9 cm$^3$, and preferably about 0.6 cm$^3$ to 0.8 cm$^3$ during application of the solution to the current collector. If the volume is below these ranges, the amount of remnants of escaped microbubbles (pores) in the binder layer may be excessively reduced, thereby preventing the formation of a suitable electrically conductive path between the current collector and the active material layer, while if the volume exceeds these ranges, the amount of remnants of escaped microbubbles (pores) in the binder layer may be excessively increased, thereby preventing the obtaining of suitable adhesion (adhesive strength) between the current collector and the active material layer. Furthermore, typically 10% by volume or more (and preferably 50% by volume or more) of the bubbles are contained in solution as microbubbles. Substantially all of the bubbles contained in the solution may be microbubbles.

There are no particular limitations on the procedure used to mix the microbubbles into the binder solution 50. For example, this may be carried out by mixing a prescribed amount of microbubbles into the binder solution using a suitable bubble generator (such as a bubble generator that uses gas-liquid shearing).

There are no particular limitations on the binder, and the binder may be the same as binders used in positive electrodes for typical lithium secondary batteries of the prior art. For example, a water-soluble or water-dispersible polymer such as styrene-butadiene rubber (SBR), carboxymethyl cellulose (CMC), polytetrafluoroethylene (PTFE), polyethylene (PE) or polyacrylic acid (PAA) can be used. Alternatively, an organic solvent-based polymer such as polyvinylidene fluoride (PVDF) or polyvinylidene fluoride-hexafluoropropylene copolymer (PVDF-HFP) can be used.

Furthermore, the binder solution can contain other binder layer-forming components other than the binder and microbubbles as necessary. An example of such a material is an electrically conductive material. Carbon-based materials such carbon black represented by acetylene black (AB) or carbon fibers are preferably used for the electrically conductive material. Alternatively, an electrically conductive metal powder such as nickel powder may also be used. The use of the binder solution 50 containing an electrically conductive material makes it possible to impart electrical conductivity to the insulating binder layer 20, thereby making it possible to further lower interfacial resistance between the current collector and the active material layer.

In a preferable aspect disclosed herein, the microbubbles 52 are charged to a prescribed polarity, and the binder solution 50 contains the electrically conductive material 54 capable of being charged to the opposite polarity of the polarity of the microbubbles 52. In this embodiment, as shown in FIG. 2, the surfaces of the microbubbles 52 are negatively charged. In this case, the electrically conductive material 54 is preferably positively charged. When the electrically conductive material 54 is positively charged (opposite polarity from the polarity of the microbubbles 52) in this manner, the electrically conductive material 54 gathers around the microbubbles 52 due to electrical attraction (electrostatic attraction). Consequently, as shown in FIG. 5, the electrically conductive material 54 is selectively arranged in the remnants of escaped microbubbles (pores) 22 formed as a result of drying. As a result, interfacial resistance between the current collector and the active material layer can be effectively reduced.

There are no particular limitations on the method used to positively charge the electrically conductive material 54. For example, an electrically conductive agent can be used that has the property of the material per se being initially positively charged. Examples of such electrically conductive agents include carbon-based materials such as carbon black (for example, acetylene black) or carbon fibers. Alternatively, special measures may be taken so that the electrically conductive material is positively charged. An example of such a measure that can be employed is a contact charging method in which a charged member to which a voltage is applied is contacted with an electrically conductive material.

Although there are no particular limitations thereon, the size of the negative potential of the microbubbles is normally about −10 mV to −50 mV (for example, −30 mV). In this case, the size of the positive potential of the electrically conductive material is preferably about 10 mV to 50 mV, and normally is preferably about 20 mV to 40 mV. The size of the potential can be determined with, for example, a zeta potential analyzer.

Furthermore, although there are no particular limitations thereon, the solid content of the binder solution 50 is preferably about 2% by weight or more, and more preferably about 5% by weight to 40% by weight. In addition, the proportion of binder contained in the solid fraction of the binder solution 50 is preferably about 15% by weight or more and more preferably about 15% by weight to 30% by weight. In addition, the proportion of the electrically conductive material contained in the solid fraction of the binder solution 50 is preferably about 70% by weight or more and more preferably about 70% by weight to 85% by weight.

Once the binder solution 50 containing the microbubbles 52 has been prepared in this manner, the binder solution is imparted (and typically, coated) onto the current collector 10 to form the binder solution layer 56 as shown in FIG. 3.

An ordinary liquid coating technology such as a printing method (such as inkjet printing, relief printing, gravure printing or screen printing) or dispenser method can be employed for the procedure used to impart (coat) the binder solution onto the current collector. In the technology disclosed herein, an example of a method used to coat the binder solution 50 on the current collector 10 consists of coating the binder solution in layers on the surface of the current collector using gravure printing. As a result, the binder solution layer 56 can be formed having a uniform thickness. The thickness of the binder solution layer can normally be made to be 2 µm to 100 µm (for example, 5 µm to 100 µm), and, for example, can suitably be made to be 2 µm to 20 µm (and typically, 5 µm to 20 µm, and for example, about 10 µm).

Once the binder solution layer 56 has been formed in this manner, by then imparting the active layer-forming paste containing an active material onto the binder solution layer 56 as shown in FIG. 4, the binder solution layer 56 and the paste layer (wet active material layer) 36 are deposited on the current collector 10.

Here, the active layer-forming paste can be prepared by mixing the positive electrode active material (typically, in powdered form) 32 and another positive electrode active material layer-forming component, which is used as necessary, in a suitable solvent.

There are no particular limitations on the positive electrode active material (typically, in powdered form) 32 provided it is used in a typical lithium ion secondary battery. Typical examples of the positive electrode active material 32 positive electrode active materials composed mainly of an oxide containing lithium and one type or two or more types of transition metal elements as constituent metal elements thereof (lithium-containing complex oxides), such as lithium nickel oxide ($LiNiO_2$), lithium cobalt oxide ($LiCoO_2$) or lithium manganese oxide ($LiMn_2O_4$). Lithium-containing complex oxide powders prepared using conventionally known methods, for example, can be used as is for these lithium-containing complex oxide powders. For example, a lithium-containing complex oxide powder substantially composed of secondary particles having an average particle diameter within the range of about 1 µm to 25 µm can be used preferably.

A preferable example of a solvent used in the active material layer-forming paste is water or a mixed solvent composed mainly of water (aqueous solvent). One type or two or more types of organic solvent capable of uniformly mixing with water (such as a lower alcohol or lower ketone) can be suitably selected and used as a solvent other than water that composes the mixed solvent. The solvent is not limited to an aqueous solvent, but rather may also be a non-aqueous solvent. An example of a non-aqueous solvent that can be used is N-methylpyrrolidone (NMP).

One type or two or more types of materials used as constituents of a positive electrode active material layer in a typical lithium secondary battery can be contained as necessary in the active material layer-forming paste. An example of such a material is an electrically conductive material. The electrically conductive material may be the same material as the electrically conductive material 54 contained in the binder 30 or a different material. In addition, examples of materials that can be used as a component of the positive electrode active material layer include various types of polymers able to function as a binder of the constituent materials. The binder may be of the same material as the binder contained in the binder layer 30 or may be a different material.

The procedure used to impart (typically, coat) the active material layer-forming paste to the current collector 10 can be carried out in the same manner as production of an electrode for a typical lithium secondary battery of the prior art with the exception of using that in which the binder solution layer 56 is formed on the surface of the current collector as previously described. For example, the paste layer 36 can be formed by coating a prescribed amount of the active material layer-forming paste 36 on the current collector 10 over the binder solution layer 56 by using a suitable coating device (such as a die coater).

Once the binder solution layer 56 and the paste layer 36 have been deposited on the current collector in this manner, by then drying both the deposited binder solution layer 56 and the paste layer 36, as shown in FIG. 5, the positive electrode 40 is obtained in which the binder layer 20 and the active material layer 30 are sequentially formed on the current collector 10.

Drying the binder solution layer and the paste layer can be carried out in the same manner as the production of a positive electrode for typical lithium secondary battery of the prior art. For example, the binder solution layer and the paste layer can be dried by passing the current collector 10 through a suitable drying oven and blowing hot air onto both sides of the current collector 10.

Although there are no particular limitations thereon, in the technology disclosed herein, the solvent in the paste layer can be allowed to volatize at a rate per 1 $m^2$ of liquid surface area of 3.0 ml/s or more (namely, 3.0 ml/s·$m^2$ or more), and for example, 3.2 ml/s·$m^2$ to 5.0 ml/s·$m^2$ (and preferably, 4.0 ml/s·$m^2$ to 5.0 ml/s·$m^2$). According to the method of the present embodiment, since it not necessary to consider the migration (uneven distribution) of binder when setting the paste drying rate, the solvent in the paste can be dried at a rapid rate of 3.0 ml/s·$m^2$ or more (and preferably, 4.0 ml/s·$m^2$ or more), thereby dramatically improving productivity.

In this manner, the battery positive electrode 40 can be produced that has a configuration in which the binder layer 20, containing a binder, and the active material layer 30, containing the positive electrode active material 32, are sequentially laminated on the positive electrode current collector 10. Furthermore, the thickness and density of the positive electrode active material layer 30 can be suitably adjusted by carrying out suitable pressing treatment (and for example, various types of conventionally known pressing methods can be employed, such as roll pressing or plate pressing) as necessary after drying.

Since the positive electrode 40 obtained in this manner has low interfacial resistance between the current collector 10 and the active material layer 30 and superior adhesion between the current collector 10 and the active material layer 30 as previously described, it can be preferably used as a constituent of various types of batteries or as a constituent (such as a positive electrode) of an electrode body housed in those batteries.

For example, the positive electrode 40 can be preferably used as a constituent of a lithium secondary battery provided with a positive electrode obtained according to any of the methods disclosed herein, a negative electrode (which can be a negative electrode produced by applying the present invention), an electrolyte arranged between the positive and negative electrodes, and typically a separator that separates the positive and negative electrodes (and which can be omitted in batteries using a solid or gel-like electrolyte). There are no particular limitations on the structure (such as a metal case or laminated film structure) or size of an outer container that composes the battery, or on the structure (such as a wound structure or laminated structure) of the electrode body having positive and negative electrode bodies as primary constituents thereof.

Since a battery constructed in this manner is provided with the positive electrode 40 that demonstrates superior adhesion between the current collector 10 and the active material layer 30 as well as low interfacial resistance between the current collector 10 and the active material layer 30, it demonstrates superior battery performance. For example, by constructing a battery using the above-mentioned electrode, a battery can be provided that satisfies at least one of superior output characteristics, high cycle durability and favorable productivity.

Figure 6:
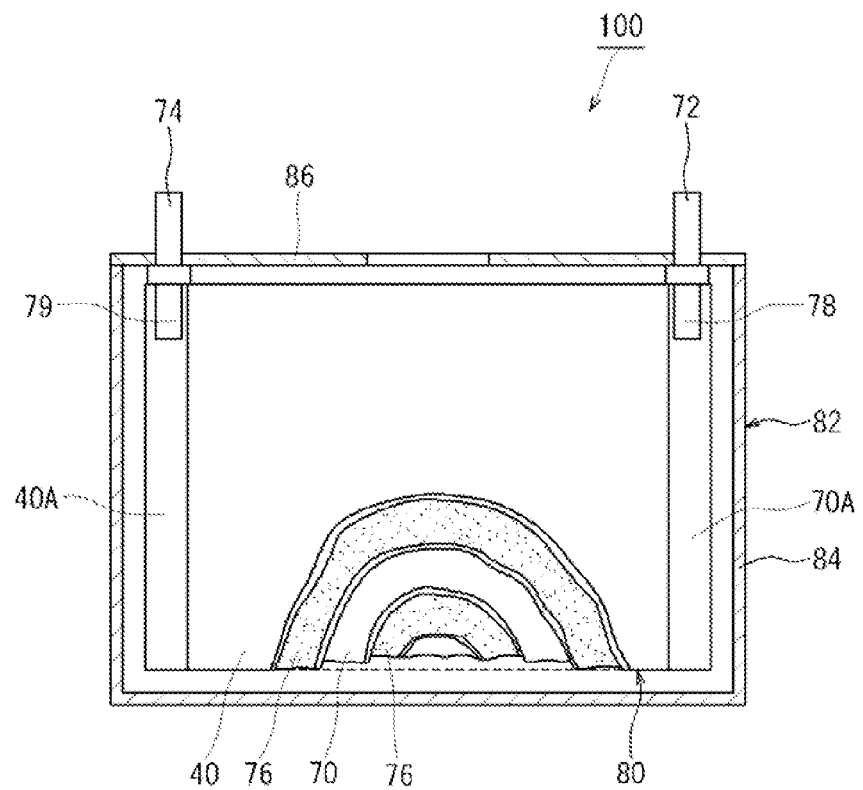
FIG. 6 is a drawing schematically showing a battery according to an embodiment of the present invention.

The following provides an explanation of an embodiment of a lithium secondary battery constructed by using the positive electrode (positive electrode sheet) 40 produced by applying the previously described method with reference to the schematic diagram shown in FIG. 6. This lithium secondary battery 100 uses the positive electrode (positive electrode sheet) 40 produced by applying a method that uses the previously described bubble-containing binder solution 50 for the positive electrode (positive electrode sheet) 40.

As shown in the drawing, the lithium secondary battery 100 according to the present embodiment is provided with a metal case 82 (preferably made of plastic or a laminated film). This case (outer container) 82 is provided with a flat, cubical case body 84, the upper end of which is open, and a lid 86 that covers the opening. A positive electrode terminal 74, which electrically connects an electrode body 80 and the positive electrode 40, and a negative electrode terminal 72, which electrically connects a negative electrode 70 of the electrode body, are provided on the upper surface (namely, the lid 86) of the case 82. Inside the case 82, for example, a long, sheet-like positive electrode (positive electrode sheet) 40 and a long, sheet-like negative electrode (negative electrode sheet) 70 are laminated and wound together with a total of two long, sheet-like separators (separator sheets) 76, and the flat, wound electrode body 80, which is produced by flattening the resulting wound body by crushing from both sides, is housed therein.

As was previously described, the positive electrode sheet 40 has a configuration in which the positive electrode active material layer 30, mainly composed of a positive electrode active material, is provided on both sides of the long, sheet-like positive electrode current collector 10 with the binder layer 20 interposed there between (see FIG. 1). Aluminum foil or other metal foil suitable for use as a positive electrode is used for the positive electrode current collector. In addition, the negative electrode sheet 70 has a configuration in which a negative electrode active material layer, mainly composed of a negative electrode active material, is provided on both sides of a long, sheet-like negative electrode current collector in the same manner as the positive electrode sheet. Furthermore, the electrode production method disclosed herein can be applied to the production of both a positive electrode and a negative electrode. The negative electrode sheet 70 may also be a negative electrode sheet 70 produced by applying a method using the previously described bubble-containing binder solution 50 in the same manner as the positive electrode sheet 30. A non-electrode active material layer-forming portion not provided with the above-mentioned electrode active material layer is formed on either side of the positive electrode sheet 30 and the negative electrode sheet 70 on one end in the direction of width thereof.

During the above-mentioned lamination, the positive electrode sheet 40 and the negative electrode sheet 70 are superimposed while slightly shifted in the direction of width so that the non-positive electrode active material layer-forming portion of the positive electrode sheet 40 and the non-negative electrode active material layer-forming portion of the negative electrode sheet 70 respectively protrude from both ends in the direction of width of the separator sheets 76. As a result, the non-electrode active material layer-forming portions of the positive electrode sheet 40 and the negative electrode sheet 70 respectively protrude to the outside from a wound core portion (namely, the portion where the positive electrode active material layer-forming portion of the positive electrode sheet 40, the negative electrode active material layer-forming portion of the negative electrode sheet 70, and the two separator sheets 76 are tightly wound) in the direction horizontal to the direction of winding of the wound electrode body 80. A positive electrode lead terminal 79 and a negative electrode lead terminal 78 are respectively provided on a protruding portion (namely, the non-positive electrode active material layer-forming portion) 40A on the side of the positive electrode and a protruding portion (namely, the non-negative electrode active material layer-forming portion) 70A on the side of the negative electrode, and the above-mentioned positive electrode terminal 74 and negative electrode terminal 72 are respectively electrically connected thereto.

Furthermore, constituents other than the positive electrode sheet 40 that composes the wound electrode body 80 may be the same as those of an electrode body of a conventional lithium secondary battery, and there are no particular limitations thereon. For example, the negative electrode sheet 70 can be formed by imparting a negative electrode active material layer composed mainly of a negative electrode active material for a lithium secondary battery on a long negative electrode current collector. Copper foil or other metal foil suitable for use as a negative electrode is preferably used for the negative electrode current collector. One type or two or more types of materials conventionally used in lithium secondary batteries can be used without any particular limitations for the negative electrode active material. Preferable examples thereof include carbon-based materials such as graphite carbon or amorphous carbon, lithium-transition metal complex oxides (such as lithium titanium complex oxide), and lithium-transition metal complex nitrides.

In addition, preferable examples of the separator sheets 76 used between the positive and negative electrode sheets 40 and 70 include those composed of a porous polyolefin-based resin. Furthermore, in the case of using a solid electrolyte or gel-like electrolyte for the electrolyte, separators may not be required (namely, in this case, the electrolyte per se can function as a separator).

Together with the wound electrode body 80 being housed within the case body 84 by inserting through the opening in the upper end of the case body 84, an electrolyte solution containing a suitable electrolyte is arranged (injected) in the case body 84. The electrolyte is, for example, a lithium salt such as $LiPF_6$. For example, a non-aqueous electrolyte can be used that is obtained by dissolving a suitable amount (for example, that resulting in a concentration of 1 M) of a lithium salt such as $LiPF_6$ is dissolved in a mixed solvent of diethyl carbonate and ethylene carbonate (having a mixing ratio of, for example, 1:1).

Subsequently, the opening is sealed by welding and so forth to the lid 86 to complete assembly of the lithium secondary battery 100 according to the present embodiment. The process for sealing the case 82 and the process for arranging (injecting) the electrolyte are the same techniques carried out in the production of a conventional lithium secondary battery, and are not intended to characterize the present invention. Construction of the lithium secondary battery 100 according to the present embodiment is completed in this manner.

Since the lithium secondary battery 100 constructed in this manner is constructed using an electrode produced by applying a method using the microbubble-containing binder solution 50 as previously described for at least one of the electrodes, it demonstrates superior battery performance. For example, as a result of constructing a battery using the above-mentioned electrode, the lithium secondary battery 100 can be provided that satisfies at least one of superior output characteristics, high cycle durability and favorable productivity.

INDUSTRIAL APPLICABILITY

According to the present invention, a battery electrode production method can be provided that makes it possible to lower interfacial resistance between a current collector and an active material layer in a battery electrode having a configuration in which a binder layer and an active material layer are sequentially laminated on a current collector.

Figure 7:
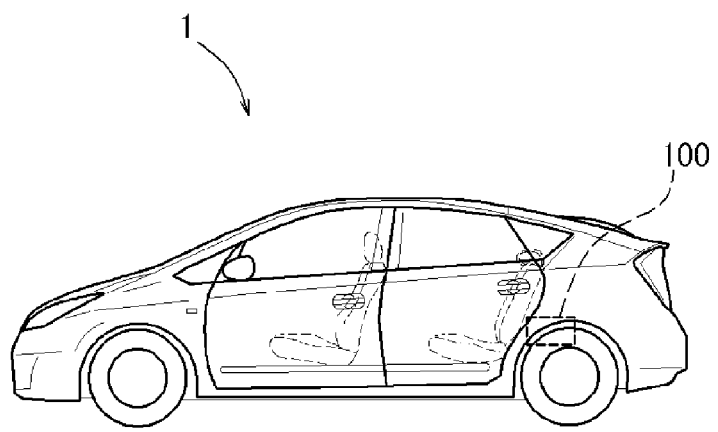
FIG. 7 is a side view of a vehicle equipped with a battery according to an embodiment of the present invention.

A battery (such as a lithium secondary battery) according to the present invention can be used particularly preferably as a power supply for a motor installed in a vehicle such as an automobile as a result of being able to demonstrate the superior battery performance as previously described. Thus, as shown in FIG. 7, the present invention provides a vehicle 1 (typically, an automobile, and particularly an automobile provided with an electric motor in the manner of a hybrid vehicle, electric vehicle or fuel cell vehicle) provided with the battery 100 (which may also be in the form of an assembled battery) for the power supply thereof.

The invention claimed is:

1. A battery electrode production method of producing a battery electrode having a configuration in which a binder layer containing a binder and an active material layer containing an active material are sequentially laminated on a current collector, the method comprising:
   mixing microbubbles with a diameter of 1 μm to 50 μm into a binder solution containing a binder and a solvent;
   forming a first layer of the bubble-containing binder solution on the current collector;
   depositing a bilayer consisting of the first layer of the bubble-containing binder solution and a second layer of a paste comprising an active material and a solvent on the current collector by imparting the paste over the binder solution; and
   drying the bilayer.

2. The production method according to claim 1, wherein bubbles smaller than the thickness of the binder solution layer are mixed in as microbubbles.

3. The production method according to claim 2, wherein the binder solution layer is formed to have a thickness of 5 μm to 100 μm.

4. The production method according to claim 1, wherein bubbles composed of a gas having a lower specific heat than a solvent of the binder solution are mixed in as the microbubbles.

5. The production method according to claim 4, wherein bubbles composed of an Ar gas are mixed in as the microbubbles.

6. The production method according to claim 1, wherein the microbubbles are charged to a prescribed polarity, and the binder solution contains an electrically conductive material that can be charged to a polarity opposite that of the polarity of the microbubbles.

\* \* \* \* \*